United States Patent [19]

Fulghum

[11] Patent Number: 5,345,469
[45] Date of Patent: Sep. 6, 1994

[54] COMMUNICATION DEVICE WITH CODE SEQUENCE SELECTION SYSTEM

[75] Inventor: Tracy L. Fulghum, Sunrise, Fla.

[73] Assignee: Motorola, Inc., Schaumburg, Ill.

[21] Appl. No.: 11,581

[22] Filed: Feb. 1, 1993

[51] Int. Cl.$^5$ .................. H04L 9/00; H04L 27/10
[52] U.S. Cl. ................................................. 375/1
[58] Field of Search ........................................ 375/1

[56] References Cited

U.S. PATENT DOCUMENTS 5,166,951 11/1992 Schilling ................................. 375/1
5,206,882 4/1993 Schloemer .............................. 375/1

OTHER PUBLICATIONS

Theory of Spread-Spectrum Communication, by Raymond L. Pickholtz, Donald L. Schilling, and Laurence B. Milstein; published in IEEE Transaction on Communication, vol. Com-30, No. 5, May 1982 . . .

Crosscorrelation Properties of Pseudorandom and related sequences, by Dilip V. Sarwate and Michael B. Pursley; published in Proceedings of the IEEE, vol. 68, No. 5, May 1980.

Primary Examiner—Salvatore Cangialosi
Attorney, Agent, or Firm—M. Mansour Ghomeshi

[57] ABSTRACT

A code division multiple access (CDMA) communication system (10) having a plurality of spreading codes including a control code includes a first communication device (100) and a second communication device (106). The first communication device is adapted for transmitting a signal spread by the control code inclusive of a request for an optimum spreading code. The second communication device (106) includes a receiver (202) and an adaptable match filter (204) for identifying the optimum spreading code. A transmitter (2024) transmits information about the spreading code to the first communication device 100. With the information on the optimum spreading code available, the first communication device (100) and the second communication device (106) continue to communicate with each other. The optimum spreading code is periodically updated by the first communication device (100) and second communication device (106) to provide for changes in the utilization of codes.

20 Claims, 2 Drawing Sheets

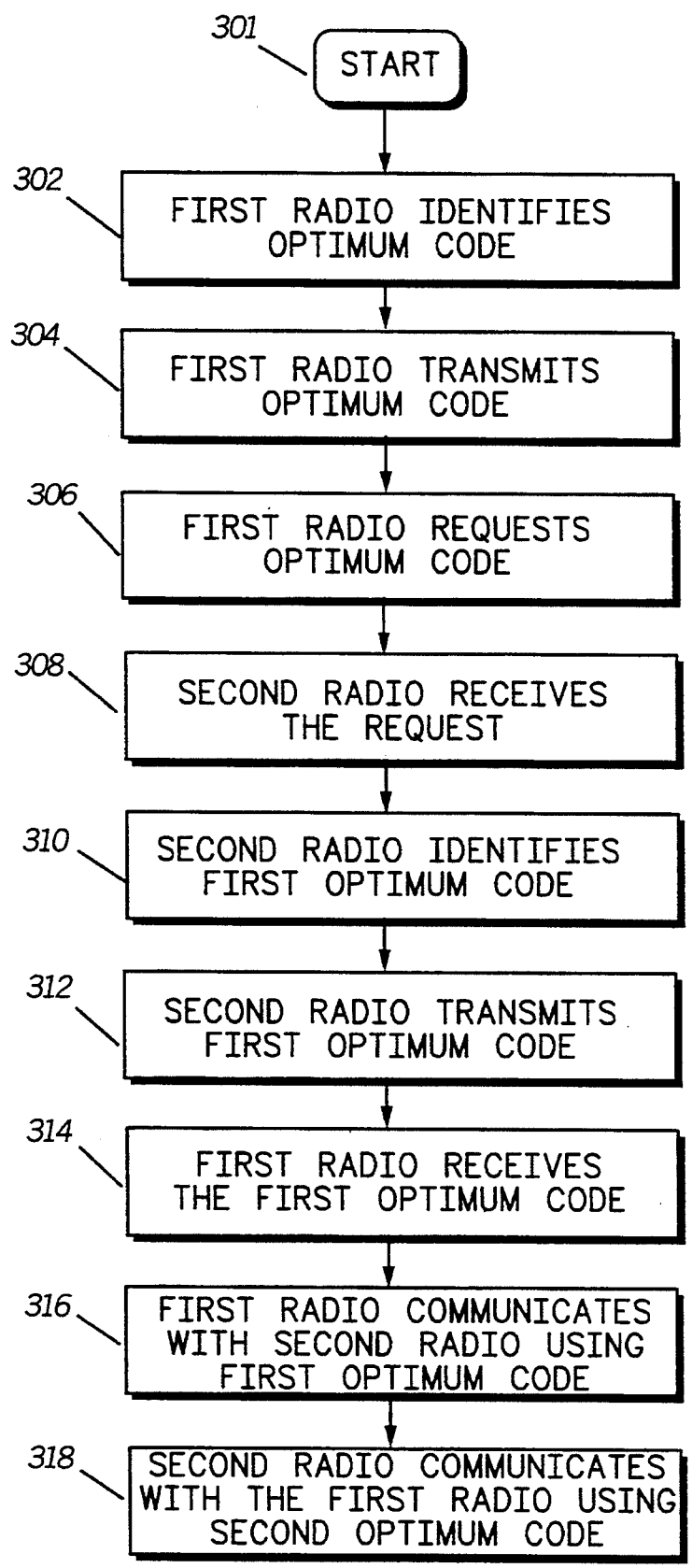

COMMUNICATION DEVICE WITH CODE SEQUENCE SELECTION SYSTEM

TECHNICAL FIELD

This invention is related in general to communication devices and more particularly to code division multiple access (CDMA) communication devices.

BACKGROUND OF THE INVENTION

In direct sequence Code Division Multiple Access (CDMA) systems, many transmitters may operate in the same frequency space. The signals are discriminated at the receiver by the difference in their pseudo-random spreading sequences or codes. Some existing systems, use a centralized base station to allocate spreading sequences or codes. These codes are selected from among a number of codes that each communication device is programmed with. The use of a base station requires that a central station keep track of all the communications between communication devices. Such a requirement demands the maintenance of a centrally located base station along with sophisticated communication equipment.

Yet in systems with no centralized base station, the codes are preprogrammed in the communication devices and are selected manually by the user. With no base station to dynamically allocate codes, the efficient reuse of codes is prevented. It is therefore desired to have a CDMA system with no base station without sacrificing code reuse and system efficiency.

SUMMARY OF THE INVENTION

In summary, a code division multiple access (CDMA) communication system is disclosed having a plurality of spreading codes including a control code. The communication system comprises a first and a second communication device. The first communication device is adapted to transmit a signal spread by the control code and inclusive of a request for an optimum spreading code. The second communication device includes a receiver for receiving the signal and means for identifying an optimum spreading code. The second communication device also includes a transmitter for transmitting the optimum spreading code to the first communication device. Upon this handshake, the first and second communication devices communicate using the optimum spreading code.

In other aspects of the present invention, a communication device having the ability to communicate to other devices using control codes is disclosed.

DESCRIPTION OF THE DRAWINGS

FIG. 3 shows a flow chart of the operation of the communication system in accordance with the present invention.

DETAILED DESCRIPTION OF THE PREFERRED EMBODIMENT

Figure 1:
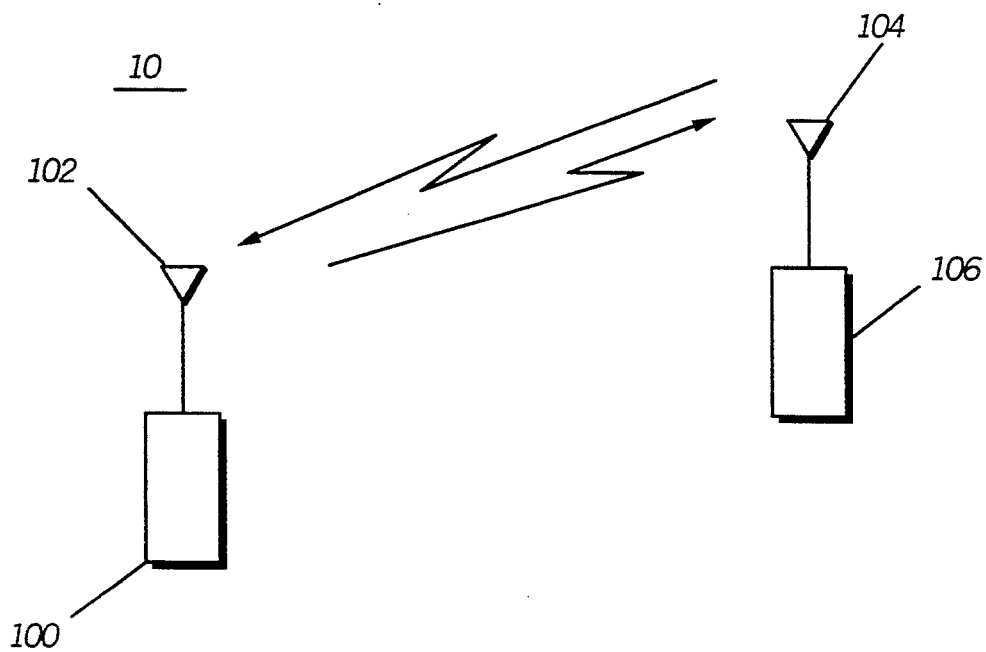
FIG. 1 shows a communication system in accordance with the present invention.

Referring to FIG. 1, a code division multiple access (CDMA) communication system is shown in accordance with the present invention. A first communication device 100 includes an antenna 102 and a second communication device 106 includes an antenna 104. In the preferred embodiment the first communication device 100 is the initiator or the originator and the second communication device 106 is the target communication device. These communication devices communicate to each other using communication device frequency signals and spreading codes. This communication system is preferably a Direct Sequence Code Division Multiple Access (DS-CDMA) communication system. As is known in the art, in such a system, many pairs of users may operate in the same frequency space and are separated from each other by using different pseudo-random spreading sequences or codes. It is the low cross-correlation aspect between the different spreading codes that allows the pairs of users to operate independently on the same frequency. An average measurement of the interference encountered between codes is mean square cross-correlation. Since the cross-correlation between the codes will depend on what time offset is between them the mean square cross-correlation is a better interference measurement. The means square cross-correlation, r, can be evaluated by the following formula:

$$\rho^2 = \frac{1}{N} \sum_{k=0}^{N-1} (r(\tau_k))^2$$

where:

$$r(\tau_k) = \int_0^{NT} c_1(t)c_2(t + \tau_k)dt$$

N = Sequence Length
t = chip duration
$t_k$ = Kth offset
$C_m(t) = M^{th}$ code sequence Different pairings of codes (Gold codes for example) will have different mean square cross-correlation values. This means how much another communicator interferes with your particular communication depends on which code it uses, and how the pairing with the code used cross-correlates. Basically by measuring the mean square cross-correlation between a code and what is on the channel, one can get a measure of how much this particular code will be interfered with in a subsequent communication, and which codes are being used in the system. In the present invention, the first communication device 100 transmits a signal spread by a control code, this signal includes a request for an optimum spreading code. The second communication device 106 receives this signal and recovers its contents using the known control code. It is noted that this control code is common for all communication devices in the communication system 10. Therefore, communication devices such as 100 and 106 are aware that each signal must be cross-correlated with the control code to determine if the signal contains control information, such as the one transmitted by the first communication device 100 requesting an optimum spreading code.

The signal, after being received by the second communication device 106, is decoded and the request for an optimum spreading code is acted upon. The communication device 106 proceeds to identify the optimum spreading code that it wishes to receive signals on. The identity of this spreading code is then transmitted to the communication device 100, using preferably the control code. This signal is received by the communication device 100 and the optimum code is recovered. Henceforth, communication from the communication device 100 to the communication device 106 is conducted using this optimum spreading code. It is noted that the communication device 106 could identify a number of spreading codes that it finds optimum to receive signals on. In such an event, the communication device 100 has the additional freedom to choose one of the plurality of codes identified by the communication device 106. This is significant particularly in simplex applications.

In other aspects of the present invention, the signal communicated from the second communication device 106 indicating the optimum spreading code includes a request for a code that is optimum for the first communication device 100. This is done so that communication device 106 can determine which spreading code the communication device 100 wishes to receive signals on. The communication device 100 determines the optimum spreading code and transmits that to the communication device 106 in its next communication. It can be seen that the first communication device 100 is now aware of the optimum spreading code that the second communication device 106 wishes to be communicated with. Similarly, the second communication device 106 is aware of the optimum spreading code that the first communication device 100 wishes to be communicated with. The communication between the two communication devices 100 and 106 will therefore continue using these optimum spreading codes.

In yet another aspect of the present invention, the communication between the first communication device 100 and the second communication device 106 may be periodically affixed by a request for an updated optimum spreading code. This is desirable in applications where an update of the optimum code is needed due to varying conditions of the CDMA channel. Indeed, it may be desired that each communication device automatically and periodically search for the most optimum code and communicate that with the other communication device at the most opportune moment. Such a system would ensure optimum communication without additional solicitation of optimum codes.

In summary, it has been shown that communication systems operating in a CDMA environment can do so using optimum spreading codes by allowing the communication units to request optimum codes before commencing communication. Therefore, a receiving unit determines optimum spreading codes for its environment then communicates that back to an originating unit. It is noted that various handshaking and protocols may be used in requesting and establishing the optimum codes for each of the communication devices. A detailed description of these various handshakes and protocols is eliminated to avoid unnecessary verbosity.

Figure 2:
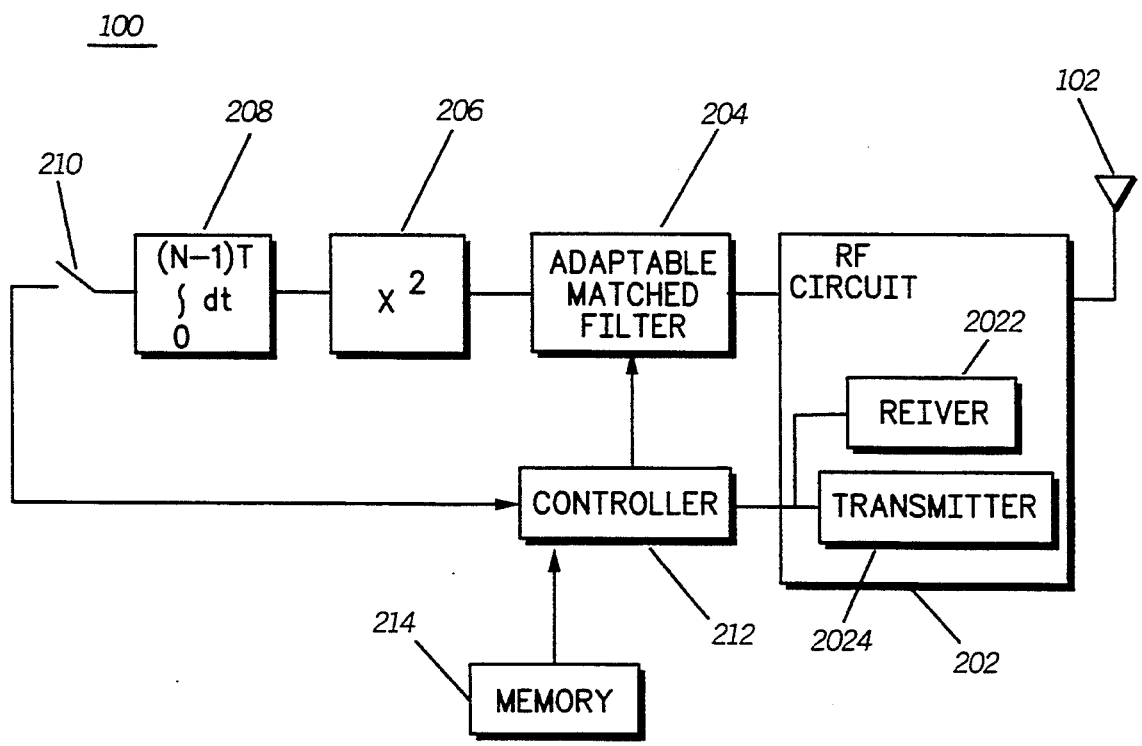
FIG. 2 shows a block diagram of a communication device in accordance with the present invention.

Referring to FIG. 2, a block diagram of the elements of the communication unit 100 is shown in a accordance with the present invention. The elements of the second communication unit 106 are similar to those of the unit 100. The antenna 102 is coupled to block 202 where all the RF circuits including filters, mixers and amplifiers are included. The RF block 202 includes a receiver 2022 and a transmitter 2024. The function of the receiver 2022 is to receive a communication device frequency (RF) signal and to provide a base band signal of the received signal. The baseband signal is then applied to an adaptable matched filter 204. The use of adaptable matched filters is well known in CDMA systems. In essence, the adaptable matched filter 204, which could be a chip matched filter, provides a correlation of each of the codes to determine which is the most optimum to use. Coupled to the matched filter 204 is a squaring device 206 followed by an integrator 208 and a sampler 210. The output of the sampler 210 is coupled to a controller 212. The controller 212 is then coupled to the adaptable matched filter 204. The controller 212 is also connected to the RF circuits 202. The combination of blocks 204, 206, 208, 210 and 212 provide the means for identifying the optimum spreading codes of the communication device 100.

In essence, the matched filter 204 runs correlation on each code. As is known, the adaptable matched filter 204 includes taps and these taps are set for a particular code to be evaluated. The output of the filter is then squared and integrated via block 206 and 208, respectively. At the end of integration, a sample is taken and dumped. In other words, the combination of blocks 208 and 210 provide an integrator and sample and dump type of circuit. The samples are then stored in a memory block 214 via the controller 212. This routine is continued until all the available codes have been correlated with the channel signal. The lowest auto correlation value is picked up by the controller 212 as being the optimum spreading code. It is understood that the procedure in determining the optimum spreading code as described above is not the only procedure available to identify optimum spreading codes. Other similar procedures may be used to provide the same results. This optimum spreading code is then transmitted via a transmitter 2024.

Referring to FIG. 3, a flow chart of the operation of the communication system 10 is shown in accordance with the present invention. From the start block 301, the first communication device 100 identifies an optimum code, via block 302. The first communication device then transmits the first optimum code, block 304. This transmission by the first communication device includes a request for an optimum code, block 306. The second communication device 106 receives the request, block 308. The second communication device identifies the first optimum code, block 310 and transmits it via block 312. Block 314, the first communication device receives the information and the identity of the first optimum code and further communicates with the second communication device using the code, block 316. The second communication device then communicates with the communication device using the second optimum code, block 318.

It can be seen that each communication device requests codes that are optimum for its situation. These requests and initial communications are conducted on the control code. Using this method of allocating spreading codes provides for the communication devices to effectively communicate with each other using optimum spreading codes hence providing for a higher degree of reusability. It is noted that this system is a self organizing system which does not need a central station to keep track of spreading codes. The originating communication device and the targeted communication device both individually are in control of their own optimum codes and communicate those optimum codes to each other periodically.

Although it has been demonstrated that the first communication device selects an optimum code before soliciting one from the second communication device, it is understood that this is not necessary to the principles of the present invention. One could simply desire to have the first communication device request from the second communication device an optimum code and proceed to search for its own optimum code. Indeed, it is understood that different sequences and or protocols may be used for the procurement of optimum codes without significantly departing form the spirits of the present invention.

In summary, it has been shown that an initiating communication device uses a code reserved as a control code to establish communication with a target communication device. The target, like other communication devices in the system, idly receives this signal and uses the control code to despread it. The specification of the target communication device is made by an identifier in the modulated data. The first signal transmitted by the initiating communication device will include a request for a target communication device. The target communication device acknowledges this call and proceeds to determine an identify an optimum spreading code. This may be accomplished by using means square cross-correlation measurements between the channel and each of a number of available codes. Upon completion of these measurements the initiator and targeted communication devices both revert to the control code for spreading and despreading a exchange data on the channel conditions at each end. After this handshake, some algorithm to decide which code is mutually beneficial to be used by the initiator who would instruct the target which specific code would be used. It is noted that the initiator and the targeted communication devices may use different spreading codes in their outbound communication signals.

There are several benefits offered by the present invention over the prior art. First, communication devices need no longer be pre-programmed with spreading codes, since these codes are solicited by the originating devices. Second, existing codes may be dynamically reused. Codes may be reused as soon as they are dropped. This results in significant improvements in the availability of codes, hence higher efficiency. Third, the dynamic selection of codes is accomplished without the need for a central station. In other words, since a system in accordance with the present invention is self maintained there is no need for a separate station to keep track of codes in use.

I claim:

1. A Code Division Multiple Access (CDMA) communication system for reuse of available spreading codes, the system having a control spreading code and comprising:
    a first communication device for transmitting a first signal spread by the control spreading code, the first signal includes a request for a first spreading code;
    a second communication device, including:
        a receiver for receiving the first signal;
        means for identifying the first spreading code determined to be optimum for the reception of signals by the second communication device; and
        a transmitter for transmitting the identity of the first spreading code to the first communication device;
    whereby the first communication device communicates with the second communication device using the first spreading code.

2. The communication system of claim 1, wherein the first and second communication devices include Direct Sequence Code Division Multiple Access (DSCDMA) communication devices.

3. The communication system of claim 1, wherein the means for identifying identifies a plurality of spreading codes optimum for the reception of signals by the second communication device.

4. The communication system of claim 3, wherein the first communication device selects one of the plurality of spreading codes to communicate with the second communication device.

5. The communication system of claim 1, wherein the transmitter includes a controller for requesting a code that is optimum for the first communication device.

6. The communication system of claim 1, wherein the first communication device includes means for identifying a second spreading code optimum for the first communication device.

7. The communication system of claim 1, wherein the first communication device includes means for periodically checking for optimum codes and communicating them to the second communication device.

8. The communication system of claim 1, wherein the second communication device includes means for periodically checking for optimum codes and communicating them to the first communication device.

9. In a DSCDMA communication system having at least a first and a second communication device, a method for providing communication between the first and the second communication devices with optimum reuse of spreading codes, comprising the steps of:
    in the first communication device:
        transmitting a signal to the second communication device requesting a first spreading code;
    in the second communication device:
        receiving the signal;
        identifying a first spreading code determined to be optimum for the reception of signals by the second communication device;
        transmitting information about the first spreading code to the first communication device; and
        receiving signals from the first communication device spread by the first spreading code.

10. The method of claim 9, further including the step of:
    in the first communication device, identifying a second spreading code optimum for the first communication device.

11. The method of claim 10, further including the step of:
    in the first communication device, transmitting the second spreading code.

12. The method of claim 9, further including the step of:
    in the second communication device, receiving the second spreading code and communicating with the first communication device using the second spreading code.

13. The method of claim 9, further including the step of:
    periodically updating the first and second spreading codes.

14. The method of claim 13, further including the step of: the first and the second communication devices communicating the updated spreading codes to each other as they are updated.

15. The method of claim 13, further including the step of:
    the first and the second communication devices communicating with each other using the updated spreading codes.

16. The method of claim 9, wherein the step of identifying identifies a plurality of spreading codes optimum for the second communication device.

17. The method of claim 16, further including the step of:

in the first communication device, identifying which of the plurality of spreading codes is optimum to communicate with the second communication device.

18. A CDMA communication device having a control code, comprising:

a receiver for receiving a signal coded with the control code from a communication unit, the signal including a request for a first spreading code;

means for identifying the first spreading code determined to be optimum for the reception of signals by the receiver;

a transmitter for transmitting information about the first spreading code; and the receiver includes means for receiving and decoding signals spread by the first spreading code.

19. The receiver of claim 18, further including an adaptable matched filter.

20. The receiver of claim 18, wherein the means for identifying includes means for periodically searching for optimum spreading codes.

* * * * *